US006856419B2

(12) United States Patent
Bronstein et al.

(10) Patent No.: US 6,856,419 B2
(45) Date of Patent: *Feb. 15, 2005

(54) DATABASE FUNCTIONS IN A CLOSED LOOP CEPS-PRESS SYSTEMS

(75) Inventors: Rafail Bronstein, Kfar Saba (IL); Ehud Spiegel, Petach Tikva (IL); Ephraim A. Carlebach, Ra'anana (IL)

(73) Assignee: Creo IL LTD, Herzlia (IL)

( * ) Notice: Subject to any disclaimer, the term of this patent is extended or adjusted under 35 U.S.C. 154(b) by 0 days.

This patent is subject to a terminal disclaimer.

(21) Appl. No.: 10/649,291

(22) Filed: Aug. 27, 2003

(65) Prior Publication Data

US 2004/0036918 A1 Feb. 26, 2004

Related U.S. Application Data

(60) Continuation of application No. 10/329,260, filed on Dec. 23, 2002, which is a continuation of application No. 09/736,610, filed on Dec. 14, 2000, now Pat. No. 6,545,772, which is a division of application No. 09/224,689, filed on Jan. 4, 1999, now Pat. No. 6,181,439, which is a division of application No. 07/650,249, filed on Feb. 4, 1991, now Pat. No. 5,875,288.

(30) Foreign Application Priority Data

| Feb. 5, 1990 | (IL) | ................................................ 93274 |
| Feb. 22, 1990 | (IL) | ................................................ 93493 |
| Dec. 27, 1990 | (IL) | ................................................ 96816 |
| Dec. 30, 1990 | (IL) | ................................................ 96829 |
| Jan. 15, 1991 | (IL) | ................................................ 96955 |
| Jan. 15, 1991 | (IL) | ................................................ 96957 |

(51) Int. Cl.[7] .......................................................... G06K 15/00
(52) U.S. Cl. ............................................. 358/1.15; 355/1.16
(58) Field of Search ............................ 358/1.1, 1.16, 358/1.14, 3.07, 3.13, 523, 524, 530, 448, 296, 1.15

(56) References Cited

U.S. PATENT DOCUMENTS

| 4,150,991 A | 4/1979 | Dillow | ........................... 96/41 |
| 4,350,996 A | 9/1982 | Rosenfeld | ..................... 358/75 |
| 4,456,924 A | 6/1984 | Rosenfeld | ..................... 358/75 |

(List continued on next page.)

FOREIGN PATENT DOCUMENTS

| DE | 3804941 | 2/1988 |
| EP | 0 095 649 B1 | 12/1983 |
| EP | 0309196 | 3/1989 |
| EP | 0348908 | 1/1990 |
| EP | 0402079 | 12/1990 |
| GB | 2055010 | 3/1984 |
| GB | 2160055 | 12/1985 |
| GB | 2128843 | 7/1987 |
| JP | 62/1987-170346 | 7/1987 |
| JP | 1-218835 | 9/1989 |
| WO | 8907525 | 8/1989 |

OTHER PUBLICATIONS

Japanese Laid–Open Publication 1–218835 and English translation. Date of Laid Open Publication Sep. 1, 1989.
Japanese Laid–Open Publication 62/1987–170346 and English translation. Date of Laid Open Publication Jul. 27, 1987.

(List continued on next page.)

*Primary Examiner*—Arthur G. Evans
(74) *Attorney, Agent, or Firm*—Ladas & Parry LLP

(57) ABSTRACT

An integrated computerized system for use in color printing having at least one digital representation of a color characteristic of at least one page to be printed and a digital storage memory for storing the digital representation. An imposition apparatus is connected to the storage memory to receive the digital representation and arrange the digital representation in accordance with a desired plate layout, thereby to define a plate image. A press set-up device extracts from the plate image the color characteristic and provides ink flow set-up data to a printing press in accordance with the extracted color characteristic.

13 Claims, 7 Drawing Sheets

U.S. PATENT DOCUMENTS

| | | | |
|---|---|---|---|
| 4,499,489 A | 2/1985 | Gall et al. | 358/536 |
| 4,520,454 A | 5/1985 | Dufour et al. | 355/75 |
| 4,552,165 A | 11/1985 | Luska | 137/3 |
| 4,660,159 A | 4/1987 | Ott | 364/526 |
| 4,718,784 A | 1/1988 | Drisko | 400/68 |
| 4,853,709 A | 8/1989 | Stein et al. | 358/75 |
| 4,901,254 A | 2/1990 | Dolezalek et al. | 364/526 |
| 4,924,301 A | 5/1990 | Surbrook | 358/75 |
| 4,936,211 A | 6/1990 | Pensavecchia et al. | 101/136 |
| 5,095,330 A | 3/1992 | Nishida et al. | 355/75 |
| 5,128,879 A | 7/1992 | Greve et al. | 364/526 |
| 5,241,657 A * | 8/1993 | Fine et al. | 345/501 |
| 5,875,288 A | 2/1999 | Bronstein | 395/109 |
| 5,963,731 A * | 10/1999 | Sagawa et al. | 703/6 |

OTHER PUBLICATIONS

Prospectus "HelioSet—for reliable gravure"; Dr. Ing. R. Hell GmbH, Kiel, Germany, Aug. 1988.

Prospectus "Software HDP—to rotogravure forms without film"; Dr. Ing. R. Hell GmbH, Kiel, Germany, Sep. 1987.

Prospectus "HDP– Synthesis of EDP and gravure"; Dr. Ing. R. Hell GmbH, Kiel, Germany, Mar. 1979.

Article, "Gravure cylinder engraving systems", The Seybold Report on Publishing Systems, vol. 18, No. 5, Sep. 1988, pp. 13–15.

"NewsPlan—Digiset LS210" prospectus No. 2827794 (3def–s8810) dated Oct. 1988.

"Digiest LS210—colored full pages from the laser imager" (3d–o–8906) dated Jun. 1989.

"IP 100 upgraded" from the magazine Topics from Dr. Ing. R. Hell GmbH, Kiel, Germany, 1989. Issue 15.

* cited by examiner

DATABASE FUNCTIONS IN A CLOSED LOOP CEPS-PRESS SYSTEMS

This is a continuation of co-pending application Ser. No. 10/329,260 filed Dec. 23, 2002, which is a continuation of application Ser. No. 09/736,610 filed Dec. 14, 2000, now U.S. Pat. No 6,545,772, which is a division of application Ser. No. 09/224,689 filed Jan. 4, 1999, now U.S. Pat. No. 6,181,439, which is a division of application Ser. No. 07/650,249 filed Feb. 4, 1991, now U.S. Pat. No. 5,875,288, claims the benefit thereof and incorporates the same by reference.

FIELD OF THE INVENTION

The present invention relates to printing and graphic arts generally and more particularly to apparatus for page composition and printing and apparatus for printing control.

BACKGROUND OF THE INVENTION

The production of a book or magazine involves a large number of processes. The processes may be grouped into five general categories: prepress, plate preparation, press set up or "make ready"; press control operations; and postpress operations.

In prepress, the principal processes are graphics, image and text editing and composition. In recent years, this area has undergone revolutionary changes through application of computer technology. State of the art systems for graphics and image editing and composition, as well as the specific functions of scanning, image processing and plotting include systems manufactured and sold by Scitex Corporation Ltd., Herzlia, Israel, such as, respectively, the systems sold under the trademarks Smart Scanner, Assembler and Raystar.

Plate preparation involves a technique known as imposition or signature assembly, which refers to the arrangement of pages on a film used to produce a printing plate. The present state of the art in signature assembly is the use of large and expensive machinery requiring highly skilled operators. Presently available signature assembly machinery involves the following steps: exposure of each of a plurality of separations (such as C, M, Y and K) for each of a plurality of pages to be arranged on a single plate; and subsequently, for each separation, such as C, feeding the exposed plurality of pages to an expose and repeat device such as the Misomex Master S Series, commercially available from Misomex North America Inc., Rosemont, Ill. The expose and repeat device is operative to arrange the plurality of exposed C separations, corresponding to the plurality of pages to be arranged on a single plate, at precisely determined positions on a film and to reproduce the C separations at the precisely determined positions by a photographic process.

The C printing plate is produced by contact exposure of the film. The signature is proofed prior to exposure of the plate. The plate, once exposed, is often found to be imperfect and therefore generally requires quality inspection and defect repair processes. The plate preparation process is repeated in order to produce M, Y and K plates.

Press set-up or "make-ready" takes place after preparation of the printing plate, and involves scanning of each printing plate to obtain information necessary for press set-up. This information includes the variation of the dot percentage over each plate, which determines the required ink flow for that plate.

Press control involves adjustments to the printing press which are normally made by a pressman examining the printed output from the press or by automatic press control systems such as the SPM 700, commercially available from Gretag Data and Image Systems, CH-Regensdorf, Switzerland. Automatic press control systems are operative to scan the printed output from the press compare it to a reference, such as a signature proof, and make suitable adjustments to the printing press. Post press processes include the folding, cutting and binding of the press output.

A great number of patents exist in the area of prepress. These include co-assigned U.S. Pat. No. 4,456,924 which describes method and apparatus for screen generation, co-assigned U.S. Pat. No. 4,853,709 which describes an internal drum laser plotter, and co-assigned U.S. application Ser. No. 044,428 which describes a color digital scanner.

Various processes in the production of printed matter are discussed in the following publications, the disclosures of which are incorporated herein by reference:

Alfred Furler, *Folding in Practice*, in collaboration with STAHL GMBH & Co., 3rd Edition, Germany, 1983;

William Schreiber, *Fundamentals of Electronic Imaging Systems*, Springer-Verlag, New York, 1986;

R. K. Molla, *Electronic Color Separation*, RK Publications, 1988; and

Michael H. Brill (Ed.), *Perceiving, Measuring and Using Color*, SPIE Proceedings, Vol. 1250, Billingham, Wash., USA, February 1990;

Robert A. Ulicheney, *Digital Halftoning and Physical Reconstruction Function*, Ph.D. Thesis, Massachusetts Institute of Technology, MA, USA, June 1986; and Raymond Blair and Charles Shapiro (Eds.), *The Lithographer's Manual*, GATF, USA, 1980.

A state of the art printing press is described in U.S. Pat. No. 4,936,211 to Pensavacchia et al. Pensavacchia et al mention printing apparatus which is intended to achieve complete computer control over the entire printing process, including plate generation, ink regulation and the start-up, print, hold, shut-down and clean-up stages of the actual printing operation. Pensavacchia et al also refer to a press including a workstation which allows an operator to input a representation of an original picture to be printed. The workstation may include a CRT display and internal memory for storing image data so that the impression to be printed may be previewed before printing and a keyboard via which the operator may key in instructions regarding the particular press run such as the number of copies to be printed or the number of colors in the printed copies. The workstation also is intended to allow complete control over the operating modes of the press including printing plate imaging, press startup procedure, ink flow regulation, dampening, print, pause and shutdown and clean-up sequences.

Computer technology has also been proposed for use in facilitating certain stages of the imposition process as described in European Published Patent Application 0309196, published Mar. 29, 1989, European Published Patent Application 0348908, published Jan. 3, 1990 and in U.K. Patent 2128843, published on May 2, 1984. U.S. Pat. No. 4,150,991 describes one type of optical imposition machine mploying transparencies.

SUMMARY OF THE INVENTION

The present invention seeks to provide an integrated computerized system for carrying out multiple stages of a printing process. In accordance with a preferred embodiment of the invention, the integrated computerized system is capable of carrying out functions in all stages of the printing process from pre-press to press control.

There is thus provided in accordance with a preferred embodiment of the present invention an integrated computerized system for use in printing including apparatus for providing at least one digital representation of at least one page, digital storage apparatus for storing the at least one digital representation of the at least one page, imposition apparatus for receiving at least one digital representation of at least one page and arranging the at least one digital representation of the at least one pages in accordance with a desired plate layout, thereby to define a plate image, and press set-up apparatus for extracting from the at least one digital representation of at least one page and providing to a printing press, press set-up data.

There is also provided in accordance with a preferred embodiment of the present invention an integrated computerized system for use in printing and including apparatus for providing at least one digital representation of at least one page, digital storage apparatus for storing the at least one digital representation of at least one page, imposition apparatus for receiving the at least one digital representation of at least one page and arranging the at least one digital representation of at least one page in accordance with a desired plate layout, thereby to define a plate image, and press control apparatus for automatically monitoring the printed output of the printing press and automatically providing adjustments to printing press registration and ink flow controls in accordance therewith.

Further in accordance with a preferred embodiment of the present invention, the system also includes press control apparatus for automatically monitoring the printed sheet provided by the printing press and for providing adjustments to printing press registration and ink flow controls in accordance therewith.

Still further in accordance with a preferred embodiment of the present invention, the at least one digital representation of at least one page includes a plurality of digital representations of a corresponding plurality of pages.

Additionally in accordance with a preferred embodiment of the present invention, the at least one digital representation of at least one page includes at least one digital representation of a signature marking.

Still further in accordance with a preferred embodiment of the present invention, the at least one digital representation of a signature marking includes a digital representation of a control strip.

Additionally in accordance with a preferred embodiment of the present invention, the apparatus for providing includes editing apparatus for receiving at least one of text and graphics and providing an edited page layout.

Further in accordance with a preferred embodiment of the present invention, the editing apparatus includes a scanner and/or a workstation receiving an input from a scanner and operator inputs and being operative to provide a digitally storable page layout.

Still further in accordance with a preferred embodiment of the present invention, the press set-up apparatus includes data base apparatus for taking into account characteristics of at least one of inks and substrates to be used by the press.

Additionally in accordance with a preferred embodiment of the present invention, the press set-up apparatus also includes apparatus for taking into account characteristics of the press.

Further in accordance with a preferred embodiment of the present invention, the press control apparatus includes apparatus for extracting information from the at least one digital representation of at least one page, apparatus for comparing a press output to the extracted information, and apparatus for adjusting the press in accordance with an output indication provided by the apparatus for comparing.

There is also provided in accordance with yet a further preferred embodiment of the present invention an integrated computerized system for use in process and monochrome color printing and including apparatus for providing at least one digital representation of at least one page, digital storage apparatus for storing at least one digital representation of at least one page, imposition apparatus for receiving at least one of the at least one digital representations of at least one page and arranging the at least one digital representation of at least one page in accordance with a desired plate layout, and automatic screen characteristic selection apparatus operative to select at least one screen characteristic for each of a plurality of regions defined within at least one separation of the at least one digital representation of at least one page.

Further in accordance with a preferred embodiment of the present invention, the system includes automatic screen characteristic selection apparatus operative to locally select at least screen angles for each of at least one region in the plate layout based on the color content of the at least one region.

Still further in accordance with a preferred embodiment of the present invention, the imposition apparatus includes apparatus for providing a digital representation of the plate image and plate quality control apparatus for comparing the digital representation of the plate image to information extracted from the printed sheet provided by the printing press.

According to still a further preferred embodiment of the present invention, there is provided imposition apparatus including apparatus for receiving at least one digital representation of at least one page, apparatus for receiving a desired plate layout, and apparatus for providing a digital representation of a plate image corresponding to the at least one digital representation of the at least one page arranged in accordance with the desired plate layout.

Further in accordance with a preferred embodiment of the present invention, the apparatus for receiving includes apparatus for receiving only a portion of at least one digital representation of at least one page and the apparatus for providing a digital representation includes apparatus for providing a digital representation of a portion of the plate image in accordance with the desired arrangement of the at least one page portion on the portion of the plate.

Still further in accordance with a preferred embodiment of the present invention, the imposition apparatus includes apparatus for receiving at least one digital representation of at least one page, apparatus for receiving information pertaining to a desired plate layout, and apparatus for providing a digital representation of a plate image corresponding to the at least one digital representation of the at least one page arranged in accordance with the desired plate layout.

Additionally in accordance with a preferred embodiment of the present invention, the information includes at least information regarding folding characteristics and/or information regarding cutting characteristics, and/or information regarding binding characteristics.

Still further in accordance with a preferred embodiment of the present invention, the at least one digital representation of at least one page includes a plurality of digital representations of a corresponding plurality of pages and the imposition apparatus also includes apparatus for modifying the format of at least one of the plurality of digital representations of pages.

Additionally in accordance with a preferred embodiment of the present invention, the apparatus for receiving information includes apparatus for providing a proof of at least the plate image and/or the plate layout.

Further in accordance with a preferred embodiment of the present invention, the proof of the plate image includes an analog representation of the content of the at least one page derived from the digital representation of the content of the at least one page.

Still further in accordance with a preferred embodiment of the present invention, the plate image includes a digital representation of at least one signature marking.

There is also provided in accordance with a preferred embodiment of the present invention color separation generating apparatus including apparatus for generating a color separation, the color separation defining a plurality of regions characterized in that at least one screen characteristic within a first individual one of the plurality of regions differs from the at least one screen characteristic within a second individual one of the plurality of regions.

There is further provided in accordance with a preferred embodiment of the present invention automatic screen characteristic selection apparatus including apparatus for inspecting at least a portion of a representation of a color image, and apparatus for receiving an output indication from the apparatus for inspecting and using the output indication to select at least one screen characteristic for at least a portion of at least one separation of the color image.

Further in accordance with a preferred embodiment of the present invention, the apparatus for inspecting is operative to inspect a portion of a color image and the apparatus for receiving is operative to select at least one screen characteristic for the corresponding portion of at least one separation of the color image.

Still further in accordance with a preferred embodiment of the present invention, the apparatus for receiving includes apparatus for selecting, for at least one separation of the color image, at least one screen characteristic for each of a plurality of regions of the color image such that the at least one screen characteristic within a first individual one of the plurality of regions differs from the at least one screen characteristic within a second individual one of the plurality of regions.

Additionally in accordance with a preferred embodiment of the present invention, the representation of the color image includes a digital representation of the color image.

Further in accordance with a preferred embodiment of the present invention, the at least one screen characteristic includes at least a screen angle, and/or a screen dot shape.

Still further in accordance with a preferred embodiment of the present invention, the apparatus for inspecting includes apparatus for inspecting the color content of at least a portion of a representation of a color image and the apparatus for receiving includes apparatus for selecting at least one screen characteristic for at least one separation of the color image according to the color content of the portion of the representation of the color image.

There is further provided in accordance with still a further preferred embodiment of the present invention signature characteristic unification apparatus including apparatus for inspecting at least a portion of a representation of a signature, and apparatus for modifying at least one image characteristic within at least one region of the representation of the signature, thereby to unify the at least one image characteristic over at least a portion of the signature.

There is also provided in accordance with a preferred embodiment of the present invention, signature characteristic unification apparatus, the signature including a representation of a plurality of pages, the apparatus including apparatus for modifying at least one representation characteristic within at least one region of at least one first page from among the plurality of pages, thereby to unify the at least one image characteristic relative to at least one region of at least one second page from among the plurality of pages.

Further in accordance with a preferred embodiment of the present invention, the at least one representation characteristic includes at least one color characteristic.

Still further in accordance with a preferred embodiment of the present invention, the at least one representation characteristic includes at least one spatial characteristic.

Additionally in accordance with a preferred embodiment of the present invention, the at least one spatial characteristic includes a resolution of a color image.

There is also provided in accordance with a preferred embodiment of the present invention an image reproduction method including the steps of providing a representation of an image, the representation including a digital indication of at least one location whose appearance is to be maintained, reproducing the image so as to automatically maintain the appearance of the location.

Further in accordance with a preferred embodiment of the present invention, the representation of the image includes a digital representation of the image and the step of reproducing includes the step of providing the digital representation of the location to apparatus for reproducing the image.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

The following terms, employed herein, are intended to have the meanings specified hereinbelow:

Color image: This term is intended to include image comprising gradations of a single tone, such as black and white images.

Analog representation of a color image: Any representation of a color image which resembles the original color image. The representation may appear upon a printed page, a proof or any other suitable substrate.

Digital representation of a color image: Any representation of a color image which is expressed in discrete symbols, such as a computer file.

Color characteristics of a color image: The characteristics of the color image defined by individual elements of a representation of a color image which directly represent a color or a component of a color.

Spatial characteristics of a color image: Characteristics defining the arrangement of and the relationship between elements of a representation of a color image, such as pixels, which characteristics do not directly represent a color or a component of a color. Spatial characteristics include but are not limited to resolution and format characteristics such as pixel by pixel encoding.

Digital output device: Apparatus which inputs a digital representation of a color image and converts it into an analog representation thereof, such as but not limited to a plotter or proofer. The analog representation may be provided on any suitable substrate such as a hard copy proof, film or plate.

Figure 1:
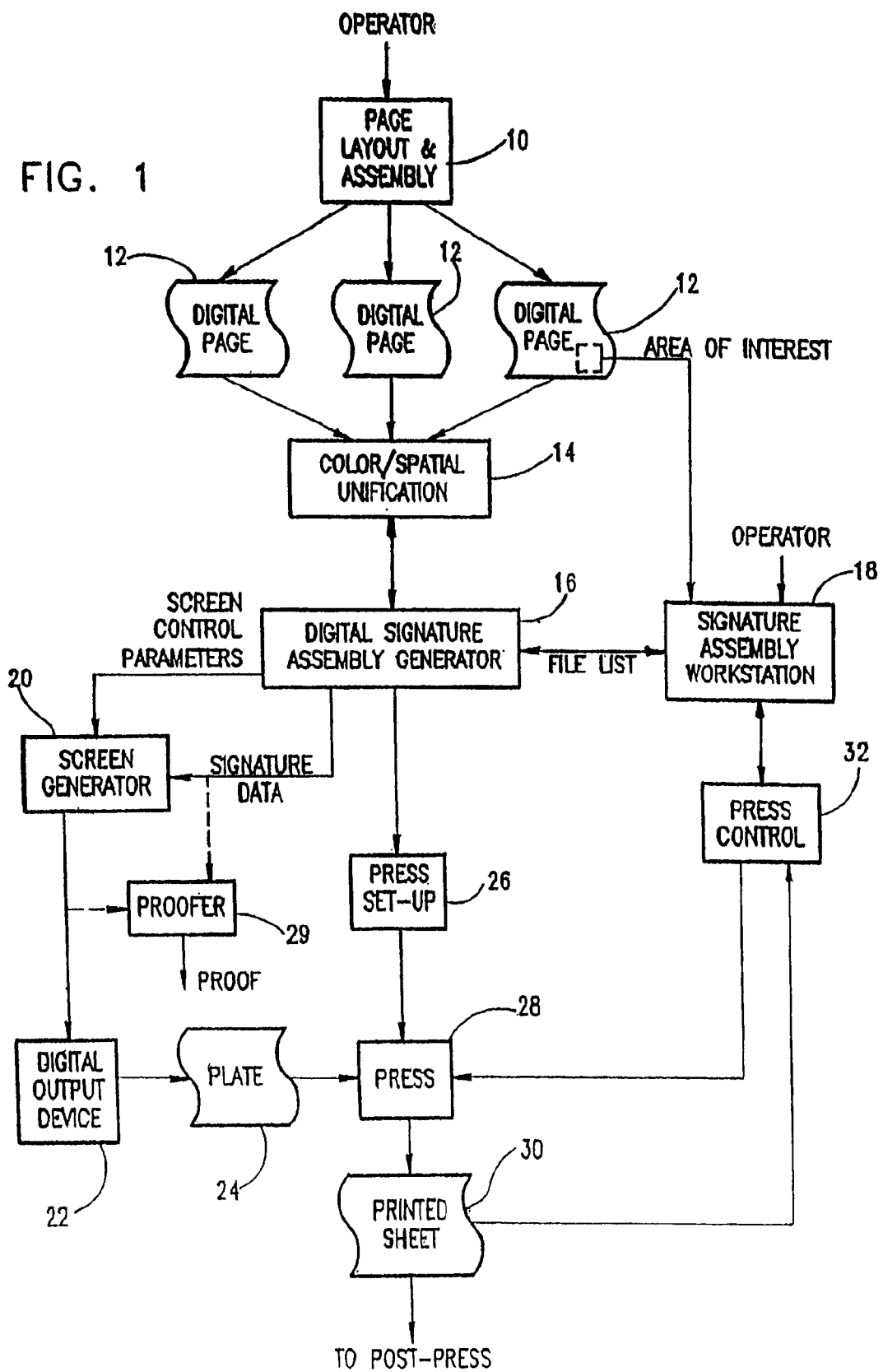
FIG. 1 is a simplified block diagram illustration of an integrated computerized system for use in printing constructed and operative in accordance with a preferred embodiment of the present invention.

Reference is now made to FIG. 1, which illustrates an integrated computerized system for use in printing constructed and operative in accordance with a preferred embodiment of the present invention and including apparatus 10 for providing a plurality of single page digital representations 12. Apparatus 10 typically comprises at least one conventional computerized page layout and assembly system, such as the Assembler workstation commercially available from Scitex Ltd. Alternatively, non-Scitex products such as Illustrator and Photoshop, both commercially available from Adobe, and Freehand, commercially available from Aldus may be employed in conjunction with an interpreter device such as PS-Bridge, commercially available from Scitex.

One or more such computerized page layout systems may be provided or linked to the system of the present invention by any suitable data communication technique or means, and may be remotely located from the rest of the system, as desired. Alternatively, the single-page digital representations may arrive from a large storage device such as a disk.

Color and spatial basis unification apparatus 14 receives the plurality of single-page digital representations from apparatus 10, each of which may have different spatial and color characteristics. Color and spatial basis unification apparatus 14 unifies the spatial and color characteristics of the single-page digital representations and outputs data for each of the single pages which preferably comprises pixel-interleaved data. Preferably, the single-page data is stored in intermediate storage and is subsequently provided to digital signature assembly generator 16 as explained below with reference to FIG. 3.

The term "pixel-interleaved data" is defined in Appendix A, attached hereto.

Color and spatial unification apparatus 14 may comprise a Trans/4, commercially available from Scitex Corporation, Herzlia, Israel, or alternatively may comprise the color and spatial transform apparatus described in Israel Patent Application No. 96957, the disclosure of which is incorporated herein by reference.

The unified page data provided by color/spatial unification apparatus 14 is provided to a digital signature assembly generator 16. Digital signature assembly generator 16 is operative to provide a digital representation of the signature by carrying out a full computerized page imposition function on the unified page data, including provision of signature markings such as registration marks, folding marks, cutting marks, control strips, as will be described in detail hereinbelow, preferably resulting in a complete digital representation of the full signature.

Signature markings are preferably provided as digital files, which are substantially analogous to the image files. The signature marking files are positioned within the signature along with the image files.

Preferably, the digital signature assembly generator 16 includes a "data" double buffer including two buffers, each of which is large enough to store the digital representation of one single separation of a signature corresponding to the data required for the exposure of an area covered by one laser beam path. At any given time, one of the two buffers of the "data" double buffer provides a first line to a digital output device 22 via screen generator 20 and the other one of the two buffers loads the line next to be provided to the digital output device 22 via screen generator 20.

Digital signature assembly generator 16 also preferably provides screen control parameters. The screen control parameters may comprise, for each of a plurality of regions defined within the pages in the signature, a plurality of parameters relating to screen angles corresponding to the plurality of separations. A plurality of screen angles corresponding to a plurality of separations in which a color image is represented is termed herein "a screen angle quartet". However, it is appreciated that the number of separations be used to represent the color image need not be 4, but rather may also be any other suitable number such as 3.

Preferably, each screen angle quartet is represented by a suitable code indication, termed herein a "screen control code value". For example, the code value "1" may represent the screen angle quartet (0, 15, 30, 60), the four components representing the screen angle in degrees for the C, M, Y and K separations respectively. The code value "2" may represent the screen angle quartet (30, 0, 15, 60). A LUT in signature assembly generator 16 may be used to convert the code values to screen angles according to separation.

Preferably, the digital signature assembly generator 16 includes a "regions" buffer. The screen control data for each signature line typically comprises a plurality of screen angle quartets corresponding to the plurality of regions and, for each region, the byte count or number of pixels over which the region extends in the laser path direction. For each path within the signature which overlaps at least one new region, the screen control code for the new region is converted to screen angle according to separation and all relevant screen control parameters are loaded into screen generator 20 with the byte counts of the regions and of the spaces between them.

The digital signature assembly generator 16 preferably receives at least operator inputs via a signature assembly workstation 18. Signature assembly workstation 18 may comprise a computer, such as a personal computer, running a commercially available impositioning planning software package such as Impostrip, commercially available from Ultimate Technologies Inc., 4980 Buchan St. Suite 403, Montreal, Quebec H4P 158, Canada. Signature assembly workstation 18 is also preferably operative to perform the other functions described below.

Signature assembly workstation 18 is operative to provide a list of files to be impositioned, preferably including, for each color image file and for each signature marking file, information regarding desired positioning thereof on the signature. The information regarding desired positioning preferably takes into consideration characteristics of the post-press equipment such as folding, cutting and binding equipment. Therefore, signature assembly workstation 18 preferably stores information regarding the post-press equipment. This file list is provided to digital signature assembly generator 16.

Preferably, digital signature workstation 18 is operative to receive from workstation 10 in at least one of digital pages 12 an operator's selection of crucial zones, termed herein "areas of interest", whose appearances are to be faithfully reproduced. In other words, if the digital representation within a particular digital page 12 of a particular area of interest is represented by a particular vector such as a vector (C, M, Y, K) then it is desired that, when that area is printed on the press and subsequently analyzed, the resulting digital representation of the printed area of interest will remain the same (C, M, Y, K).

Preferred methods and apparatus for preserving the appearance of a color image are described in Applicant's co-assigned Israel Patent Application No. 96957.

Signature assembly workstation 18 identifies the information regarding the areas of interest by signature coordinates and provides their signature coordinates to at least press control device 32. Preferably, the above information regarding areas of interest is included in the file list described above.

The screen control parameters relating to screen angles and the digital single separation signature output of digital signature assembly generator 16 are provided to a screen generator 20, which may comprise the screen generator incorporated in the Raystar or Dolev plotters, commercially available from Scitex Corporation, Herzlia, Israel. Screen generator 20 is operative to control the writing apparatus of the digital output device 22. Screen generator 20 preferably comprises a LUT which takes into account characteristics of the press 28 such as dot gain. Digital output device 22 may comprise one or more suitable commercially available digital output devices suitable for producing separations of entire signatures, such as the ERAY or Raystar plotters, in which the writing apparatus comprises a laser beam. The resulting signature separations are exposed, thereby to provide a plurality of plates 24 corresponding to the plurality of separations, which are mounted on the press 28.

The digital signature assembly generator 16 is also operative to provide control data to a press set-up device 26 which is operative to set up or "make ready" the press 28 which produces a printed sheet 30. The press onto which the plate is mounted is typically partitioned into a plurality of strips, also termed ink-key zones, such as 16, . . . , 28 or 32 strips. Preferably, the control data provided to the press set-up device includes ink flow settings for each strip or ink-key zone. The ink flow setting for each strip may be determined according to the average dot percentage within that strip, including the dot percentages corresponding to any signature marks, such as control strips, partially or completely overlapping that strip.

According to a preferred embodiment of the invention, a proofing device 29 may be provided.

A press control device 32 is preferably provided for inspecting the printed sheet 30 at at least one location defined by workstation 10 and identified by signature co-ordinates by workstation 18 in order to obtain at at least that location an indication of the visual appearance of the image including at least its color content. This information is compared with the desired visual appearance information as derived from the corresponding digital representation 12 of the at least one page at the corresponding at least one location designated by workstation 10. On the basis of this comparison the press control device 32 may modify as necessary, on-line, at least one press control parameter such as ink flow so as to improve the visual appearance of the printed product 30.

Preferably, the press control device is operative to inspect at least the "areas of interest" selected by the operator. The signature coordinates of the areas of interest, as well as their visual appearances are provided to press control device 32 by workstation 18, as described above. The visual appearances of the areas of interest, including the color contents thereof, are compared with the corresponding desired values transferred by workstation 18. The press control device employs the comparison to modify as necessary at least one control parameter of press 28, such as amount of ink thereby to increase the correspondence between the parameters of the areas of interest as defined by page layout assembly workstation 10 and between the visual appearance of the areas of interest provided by the press 28.

Press control device 32 is also preferably operative to receive an indication of the locations and distances between registration marks in order to facilitate synchronization of the press 28.

Commercially available press set-up devices 26 include for example:

CPC3, by Heidelberg Co., Heidelberg, Germany;

Roland RCI and CCI, by Man Roland, Offenbach am Main, Germany; and

PDC Print Density Control, by Komori, Tokyo, Japan.

Press control device 32 may include a plurality of commercially available press control systems such as the following:

SPM 700, by Gretag Data and Image Systems, CH-Regensdorf, Switzerland;

Calgraph System, commercially available from Celogic, Montpellier, France; and

Image processor model IP-100, by CC1 Inc., Hackettstown, N.J., USA.

The plurality of press control systems typically includes one press control system per separation.

The apparatus of FIG. 1 preferably includes a data base, which may reside in any suitable location such as the memory of workstation 18, which stores preferred combinations of ink, paper and press parameters. The preferred combinations are preferably combinations which are known to provide faithful reproduction of color images. The database information is preferably utilized to modify the operation of color/spatial unification device 14, press set-up device 26.

The printed sheet provided by the press 28 is then provided to post-press equipment such as folding, cutting and binding equipment, using known techniques, thereby to provide a final printed product which may comprise a plurality of printed sheets, such as but not limited to a book, newspaper, or magazine.

Figure 2:
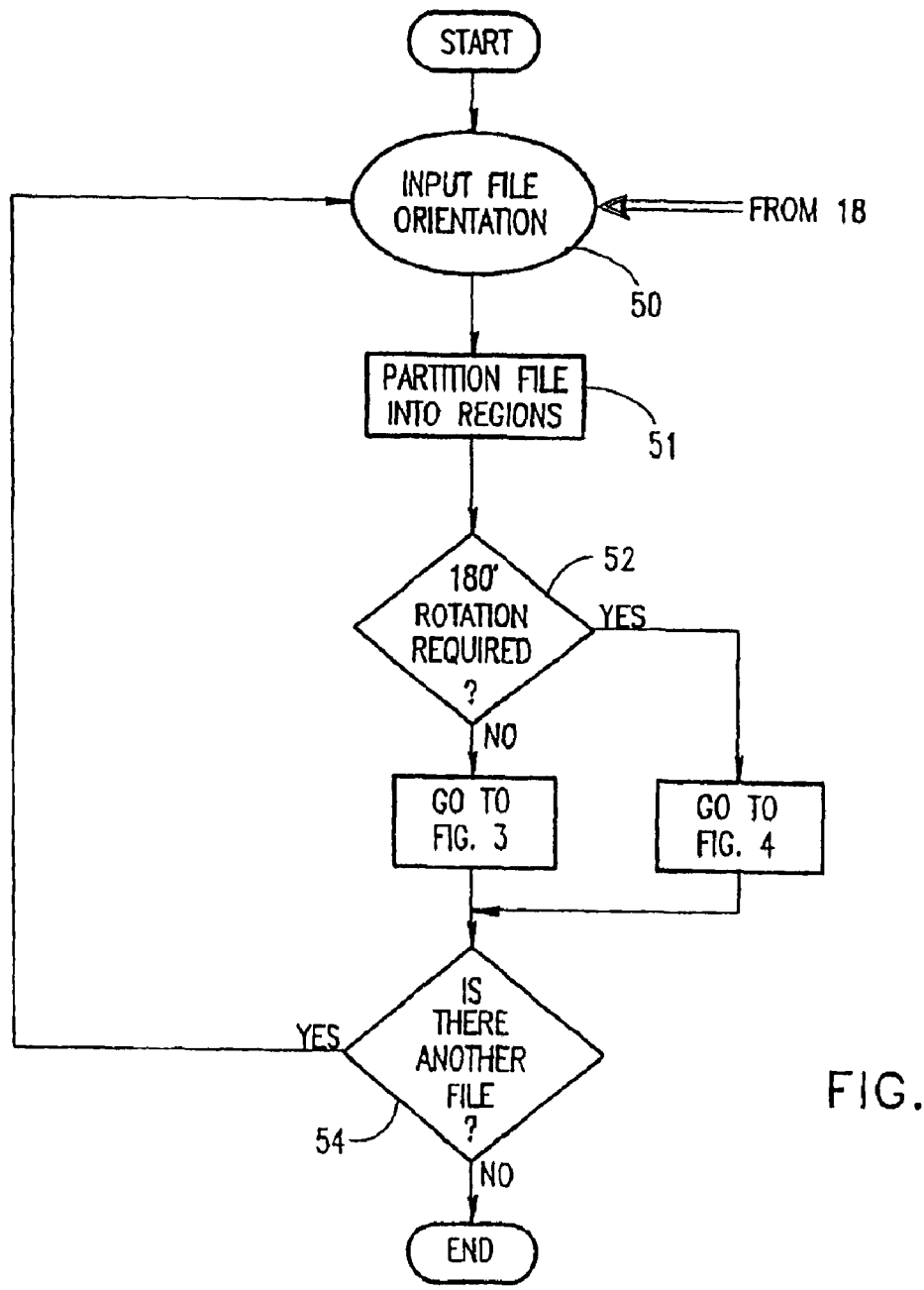
FIG. 2 is a flowchart of a preferred embodiment of a "first pass" algorithm useful in implementing digital signature assembly generator 16 of FIG. 1 and comprising a procedure for file reading and rearranging and for screen angle processing.

Reference is now made to FIG. 2, which is a generalized flow chart illustrating an algorithm useful in implementing digital signature assembly generator 16 of FIG. 1.

As shown in FIG. 2, the first step 50 of the algorithm is to receive from signature assembly workstation 18 information regarding the orientation of the image represented by a particular digital file such as its desired position on the page and whether it is to appear upright or in a rotated orientation such as upside down. This orientation information is preferably included in the file list provided by workstation 18 as described above. The digital file may comprise an individual one of digital pages 12 or may alternatively comprise a file representing page markings such as registration marks, folding and cutting marks and control strips. The orientation information is preferably included in the file list provided to digital signature assembly generator 16 by signature assembly workstation 18.

A digital representation of a control strip may be generated in the same way an ordinary image file is generated. Preferred patterns for control strips comprise the patterns of commercially available control strips from DuPont (Cromalin process) or from 3M (PrintMatch process).

Conventional patterns for folding, cutting and registration marks are known and are described in the above-mentioned text, *Folding In Practice* by Furler.

In step 51, a plurality of regions is defined which partitions the file. The regions may be of uniform size, such as 50 pixels×50 pixels. Alternatively, the regions may differ in size, the size of each region being a function of the amount of variation of the color values of the pixels within that region, such that, within each region, there is a very small amount of variation between the pixel values.

Step 52 is to determine, from operator input received via signature assembly workstation 18, whether the page or file requires rotation by 180 degrees. The page or file is then stored in blocks, using the non-rotating block providing procedure of FIG. 3, if 180-degree rotation is not required, or using the rotating block providing procedure of FIG. 4 if 180-degree rotation is required. For as long as files remain to be processed (step 54), the above process, comprising input step 50, partitioning step 51, decision step 52 and the go-to steps, termed herein "the first pass", is repeated. Step 54 may be implemented by referring to the list of files to be impositioned on the signature which may be provided by a user via signature assembly workstation 18 as explained above.

Figure 5:
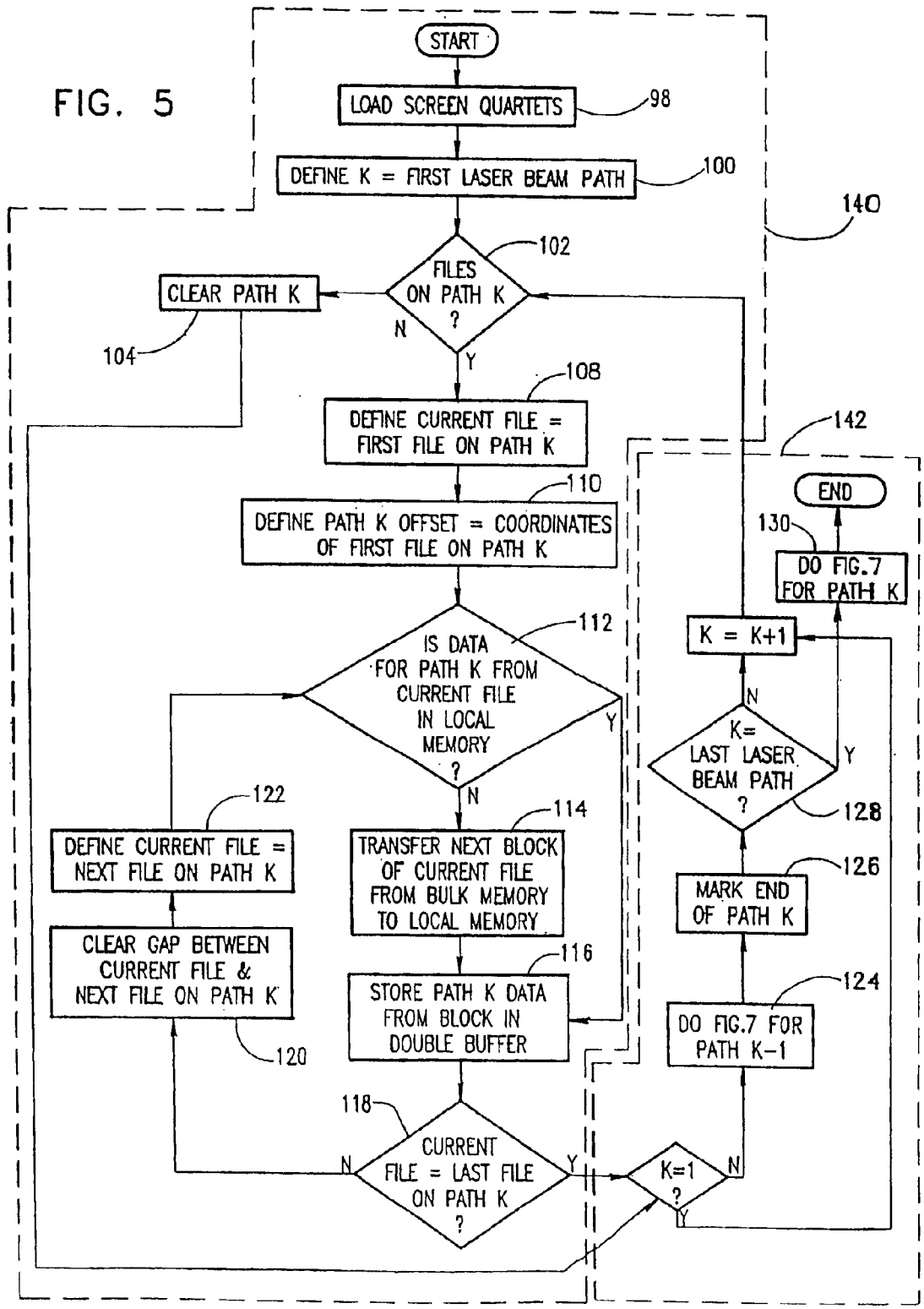
FIG. 5 is a flowchart of a preferred embodiment of a "second pass" algorithm useful in implementing digital signature assembly generator 16 of FIG. 1 and comprising a procedure for providing digital signature information to screen generator 20 of FIG. 1.

At the end of the first pass, a second process, termed herein "the second pass" and described herein with reference to FIG. 5, is initiated for each separation.

Figure 3:
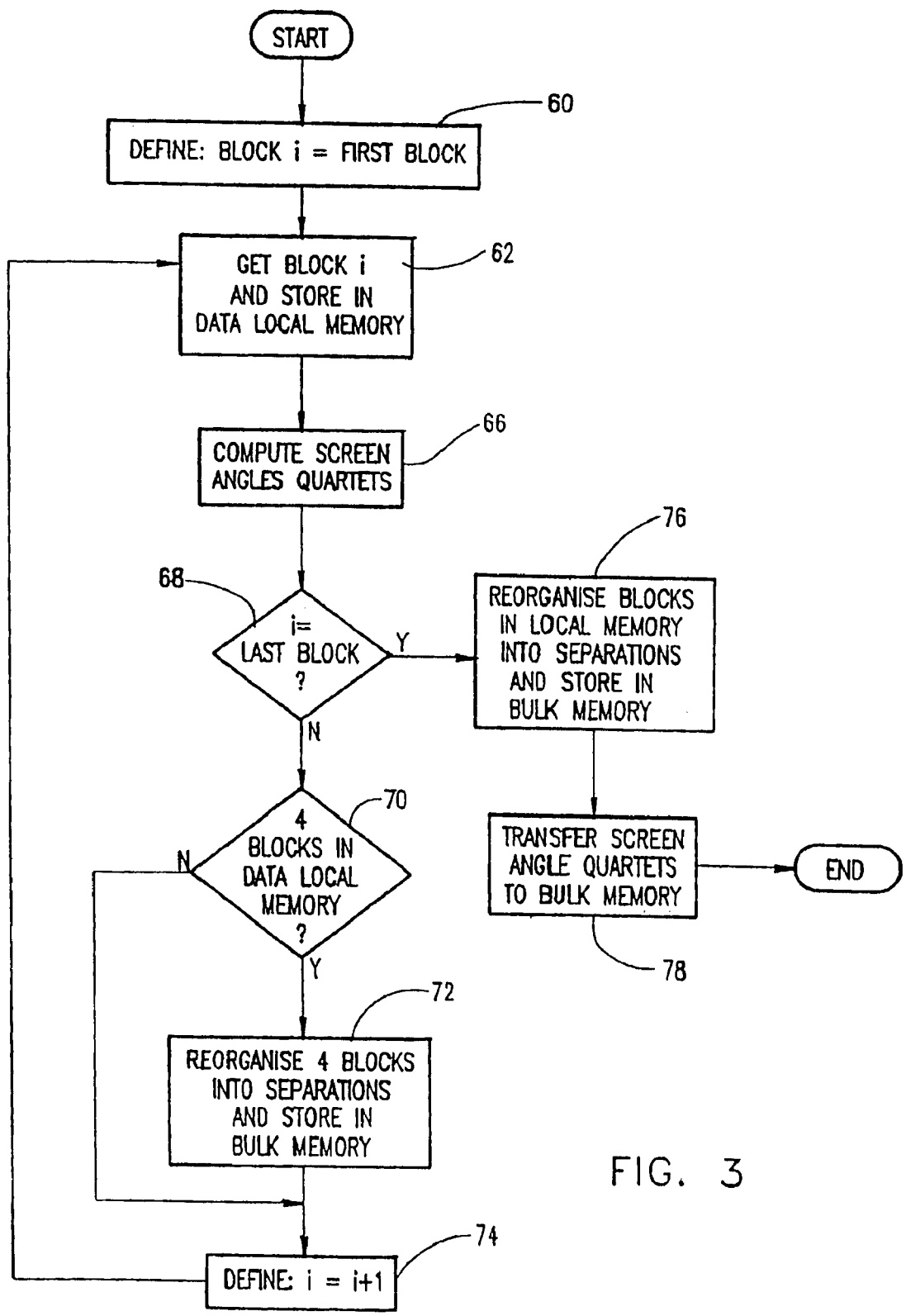
FIG. 3 is a flowchart of a non-rotating block providing procedure useful in conjunction with the algorithm of FIG. 2.

Reference is now made to FIG. 3 which is a flow chart of a non-rotating block providing procedure useful in conjunction with the algorithm of FIG. 2. As shown, the procedure of FIG. 3 comprises a first step 60 in which a block index i is initialized and assigned an initial value of 1, corresponding to the first block of the page or file being processed.

In step 62, block i is brought from an individual file from among the list of files to be impositioned. The individual file is provided to the digital signature assembly generator 16 by color/spatial unification unit 14, as shown in FIG. 1. Block i is stored in a local memory device such as a solid state memory. The block i information stored in the local memory device preferably includes the pixel interleaved data defining the corresponding portion of the color image.

In step 66, a screen subroutine is performed in which a screen angle quartet, or a screen control code value representative thereof, as explained above, is computed for each region. The screen subroutine is described in detail hereinbelow with reference to FIG. 6.

Step 68 is a decision step in which the algorithm branches depending on whether the i-th block is the last block or not. If it is not, then if 4 blocks have accumulated in local memory (step 70), the 4 blocks, each of which contain information regarding all four separations of a portion P of the page, are reorganized (step 72). Each of the reorganized blocks contains information regarding a single separation of a portion of the page four times as large as P. Step 72 is not performed until 4 blocks have accumulated in local memory.

The reorganized blocks are stored in a bulk memory unit such as a disk. The block index i is incremented (step 74) and the algorithm is repeated.

If the block index i in step 68 corresponds to the index of the last block of the page or other file, the blocks in local memory, which may number 1, 2, 3 or 4 blocks, the last of which may not be full, are reorganized (step 76). The blocks in local memory are reorganized into 4 complete or partial blocks. The reorganized blocks or partial blocks are stored in a bulk memory unit such as a disk. Step 76 is therefore similar to step 72, except that the 4 "separation" blocks are not necessarily complete blocks.

Step 76 is followed by step 78, in which screen-angle quartets computed for particular regions in step 66 are transferred from "region" local memory to bulk memory.

Figure 4:
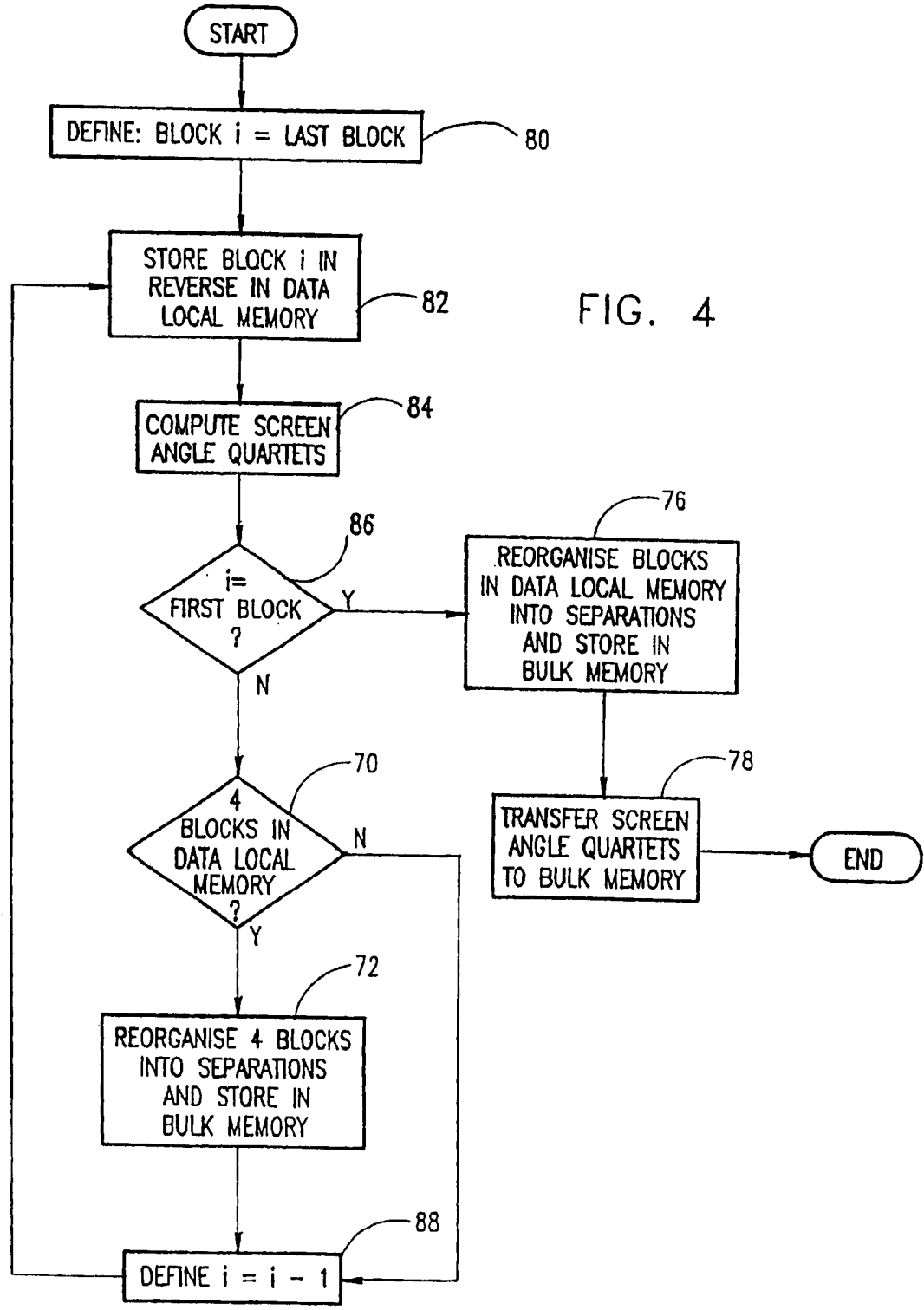
FIG. 4 is a flowchart of a rotating block providing procedure useful in conjunction with the algorithm of FIG. 2.

Reference is now made to FIG. 4 which is a flow chart of a rotating block providing procedure useful in conjunction with the algorithm of FIG. 2. The procedure of FIG. 4 is similar to the procedure of FIG. 3, analogous steps therefore having been given identical reference numerals, with the following differences. In FIG. 4, initialization step 60 is replaced by an initialization step 80 in which block index i receives an initial value indicative of the last block of the page or file.

Step 80 is followed by step 82 in which block i is brought in and is stored in local memory in reverse. In other words, in the stored block i, the row order and the pixel order within each row of the block are inverted, relative to the original block i, since the page or file is to appear "upside-down" on-the plate.

Step 84, in which screen angle quartets are computed for the various regions, is similar to step 66 and is described in detail below with reference to FIG. 6.

Decision step 68 of FIG. 3 is replaced by decision step 86 which determines whether i points to the first block. Index incrementation step 74 of FIG. 3 is replaced by index updating step 88 in which 1 is subtracted from i.

As noted hereinabove, when the "first pass" procedure of FIG. 2 is completed, a second process, termed herein "the second pass", is initiated for each separation, which provides digital information regarding the entire separation of the signature to screen generator 20 of FIG. 1. Preferably, the first and second passes are pipelined.

Reference is now made to FIG. 5 which is a flowchart of a preferred embodiment of the "second pass" procedure. As shown in FIG. 5, the "second pass" procedures begins with loading step 98 in which the screen angle quartets computed in step 66 of FIG. 3 or step 84 of FIG. 4 are loaded to local memory.

A laser beam path index initialization step 100 follows, in which an index k of the laser beam path of the digital output device 22 is initialized to correspond to the first laser beam path of digital output device 22. In step 102, reference is made to the list of files to be impositioned, which list includes information regarding desired margins and the desired arrangement of the pages on the signature, in order to determine whether laser beam path k will encounter any files or pages. If not, step 104 is operative to clear the entire buffer of the double buffer which stores path k, as by filling with zero's. If there are files along laser beam path k, a current file index or pointer is defined to refer to the first file on path k (step 108). In step 110, the offset of the laser beam path k of digital output device 22 of FIG. 1 is set with the corresponding coordinate of the first file on path k. Also, the stored information corresponding to the blank or offset portion of path k is cleared, in order to overwrite obsolete information from previous paths. As explained above, the information regarding path k is stored in one of the two buffers of the double buffer within digital signature assembly generator 16.

Decision step 112 determines whether the current file data for path k is stored in the local memory. If not, the next block of the current file is brought to the local memory from the bulk memory (step 114). The path k data is taken from that block and is stored in an individual one of the buffers of the double buffer within digital signature assembly generator 16 (step 116).

Decision step 118 determines whether the current file is the last file along path k. If not, the gap between the current file and the next file along path k, as indicated by the file list, is cleared (step 120). The current file index or pointer is updated to refer to the next file on path k and the algorithm returns to step 112.

Figure 7:
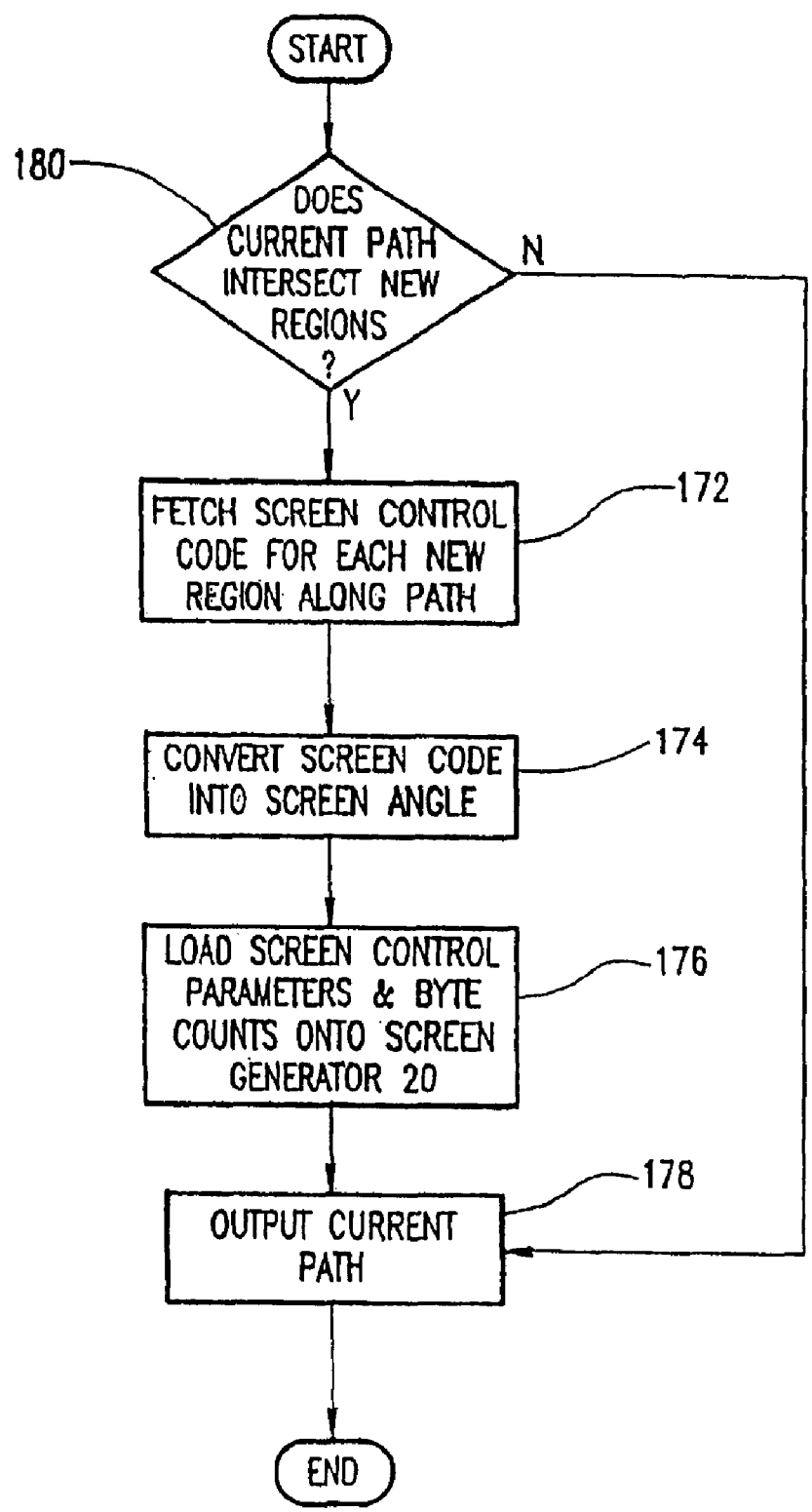
FIG. 7 is a preferred embodiment of the subroutine of steps 124 and 130 of FIG. 5.

If the result of decision step 118 is that the current file is the last file along path k, a subroutine is employed (step 124) which is operative to output path k−1 (for k>=2). If k=1, steps 124 to 128 are not performed. A preferred embodiment of the subroutine of step 124 is described below with reference to FIG. 7. The end of path k is marked in step 126. If k is not the last laser beam path (decision step 128), the laser path index k is incremented and the algorithm returns to step 102. If k is the last laser beam path, the subroutine of FIG. 7 is performed on path k, thereby to provide an output indication of path k.

The blocks of FIG. 5 define a data organization subalgorithm 140 and an output providing subalgorithm 142. Preferably, the output providing subalgorithm 142 is pipelined with the data organization subalgorithm 140 to allow continuous operation of the digital output device 22. In other words, while the data of path k is being organized, an output indication of path k−1 is being provided.

Figure 6:
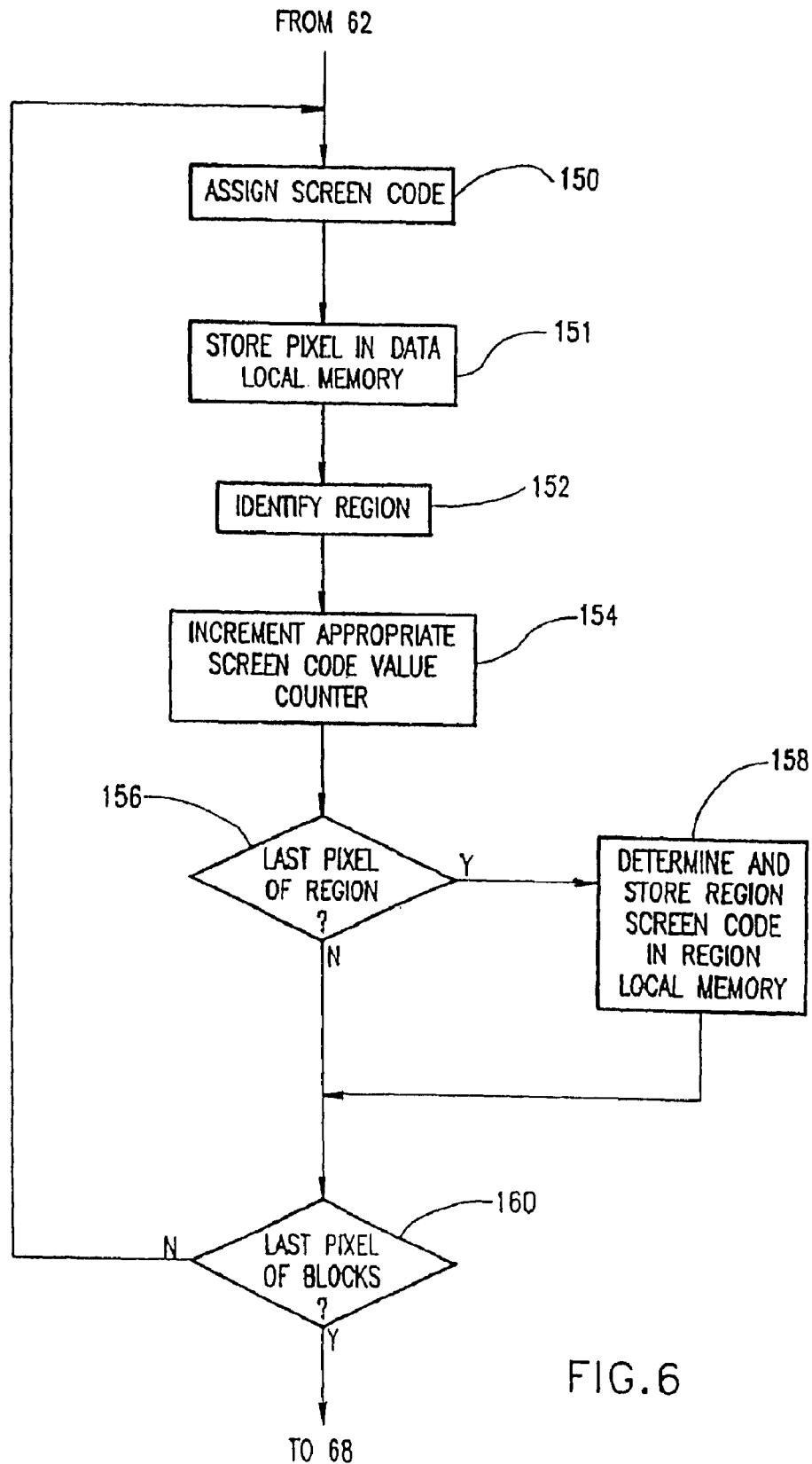
FIG. 6 is a flowchart of a preferred embodiment of the screen subroutine of step 66 of the flowchart of FIG. 3.

Reference is now made to FIG. 6 which illustrates a preferred embodiment of the screen subroutine performed at step 66 of the algorithm of FIG. 3. As explained above, the screen subroutine of FIG. 6 is operative to examine each pixel of block i and compute a screen angle quartet, corresponding to the plurality of separations, for each region whose last pixel falls within block i.

Generally speaking, the screen angle quartet for each region may be computed as follows: For each region, a plurality of counters is maintained corresponding to the plurality of code values defined by the screen code. In other words, each time a pixel within that region is found to have been assigned a particular screen code value, the counter corresponding to that screen code value is incremented. When all the pixels within the region have been examined, the most frequently occurring screen code value is assigned to the region as a whole and is termed herein the "screen control code". It is appreciated that any suitable function may replace the above mode function in computing the screen control code value of a region as a function of the screen code values of pixels within the region.

The steps of the subroutine may be as follows:

In step 150, a screen angle quartet, or a screen code corresponding to a particular screen angle quartet, is assigned to a pixel. According to a preferred embodiment of the present invention, the screen angle quartet of each pixel is a function of the lowest density component of the pixel value. A sample function for CMYK pixels is as follows:

| Lowest density component | Screen angle quartet (in degrees) | | | |
| --- | --- | --- | --- | --- |
| of pixel value | C | M | Y | K |
| C | 15 | 0 | 30 | 60 |
| M | 0 | 15 | 30 | 60 |
| Y | 30 | 0 | 15 | 60 |
| K | 60 | 0 | 30 | 15 |

In step 151, a pixel is stored in the "data" local memory.

In step 152, the region in which the pixel is included is identified. In step 154, the counter corresponding to the particular code value of the pixel, on the one hand, and corresponding to the particular region, on the other hand, is incremented.

If the pixel processed above is the last pixel of a region (step 156), then a screen control code value corresponding to a screen angle quartet may be assigned to the region (step 158). As explained above, the screen control code value of the region is preferably the screen code value which occurs most in that region. The region screen code value may be stored in "region" local memory.

If the pixel processed above is not the last pixel of the block (step 160), the algorithm, starting from step 150, is repeated for the next pixel of the block.

Step 84 of FIG. 4, in which a screen angle quartet is computed for the various regions, is now described in detail. The subroutine of step 84 may be similar to the subroutine of FIG. 6, as described above. However, in step 151, pixels are stored in the "data" local memory in reverse order. Also, in step 158, region screen control code values are stored in the "region" local memory in reverse order.

Reference is now made to FIG. 7, which is a preferred embodiment of the path outputting subroutine of steps 124 and 130 of the algorithm of FIG. 5. The path outputting subroutine preferably comprises the following steps:

In step 172, screen control code values are fetched from local memory for all new regions intersecting the current path of the laser beam of the digital output device 22 of FIG. 1. The term "new regions" here refers to regions which intersect the current path of the laser beam but do not intersect the previous path of the laser beam.

In step 174, each screen control code value is converted into the screen angle for the current separation or component of the screen angle quartet.

In step 176 the screen parameters are loaded into screen generator 20 for each region together with the byte counts corresponding to the region heights and the gap sizes in between regions. An output indication of the current path of the current separation is provided in step 178.

Step 180 is a decision step which determines whether the current path does or does not intersect any regions which did not intersect the previous path. If not, in other words, if the regions intersecting the current path are the same as the regions intersecting the previous path, steps 172, 174 and 176 may be bypassed because the screen information loaded in screen generator 20 is still correct.

In the present specification, the term "page" is intended to include any unit included within a signature which may include representations of an actual page such as a page of a book as well as representations of signature markings and control strips. The term "plate" is intended to refer to any unit of production of a printing device such as a press including, but not limited to, a print formed as defined on page 33 of the above mentioned text "Folding in Practice" by A. Furler.

It will be appreciated by persons skilled in the art that the present invention is not limited by what has been particularly shown and described hereinabove. Rather the scope of the invention is defined only by the claims which follow:

What is claimed is:

1. Data storage for a closed loop prepress to press system, said system comprising at least one page layout and assembly unit, a color-spatial unification unit, a digital signature assembly generator, a press set-up unit and a press control, said data storage comprising:
   a) means for storing data;
   b) means for receiving operator input;
   c) means for bilateral data flow from said data storage to said press control and from said press control to said data storage;
   d) means for bilateral data flow from said data storage to said digital signature assembly generator and said color-spatial unification unit and from said digital signature assembly generator and said color-spatial unification unit to said data storage;
   e) means for data flow from said at least one page layout and assembly unit to said data storage; and
   f) means for data flow from said data storage to said press set-up unit, wherein said data storage comprises at least one database.

2. The apparatus of claim 1, wherein said at least one database comprises at least one of a group consisting of: press parameters, registration marks data, preferred ink-substrate combinations and coordinates and visual appearance data of at least one "area of interest" of at least one page.

3. The apparatus of claim 1, wherein said at least one database comprises information regarding post-press equipment.

4. The apparatus of claim 1, wherein said at least one database comprises feedback information obtained from inspection of at least one printed sheet, said inspection performed by said press control.

5. The apparatus of claim 4, wherein said feedback information comprises at least one of a group consisting of: visual appearance data of at least one "area of interest" of at least one page and registration mark coordinates.

6. The apparatus of claim 5, wherein said database information is utilized to modify the operation of at least one of a group consisting of: said color-spatial unification unit and said press set-up unit.

7. A method of database utilization within a closed loop prepress to press system, said system comprising at least one page layout and assembly unit, a color-spatial unification unit, a digital signature assembly generator, a press set-up unit and a press control, said utilization comprising:
   a) loading control data by an operator into said at least one database;
   b) bilaterally communicating between said at least one database and said press control system;
   c) bilaterally communicating between said at least one database, and said digital signature assembly generator and color-spatial unification unit;
   d) communicating page data from at least one page layout and assembly unit to said at least one database; and
   e) communicating data from said at least one database to said press set-up unit.

8. The method of claim 7, wherein said loading comprises information related to post press equipment.

9. The method of claim 7, wherein said loading comprises at least one of a group consisting of: press parameters, registration marks data, preferred ink-substrate combinations and at least one "area of interest" of at least one page.

10. The method of claim 7, wherein said communicating between said at least one database and said press control comprises at least one of a group consisting of: registration marks data, press parameters, ink-substrate combinations and visual appearance data of at least one "area of interest" of at least one page.

11. The method of claim 7, wherein said communicating between said at least one database and said press control comprises visual data obtained as feedback from at least one printed sheet.

12. The method of claim 7, wherein said communicating between said at least one database and said digital signature assembly generator and color-spatial unification unit comprises at least page visual data obtained as feedback from at least one printed sheet, said visual data utilized to modify the operation of at least one of a group consisting of: said color spatial unit and said press set-up unit.

13. The method of claim 11, wherein said communicating said page visual data includes at least page data related to "areas of interest".

* * * * *

UNITED STATES PATENT AND TRADEMARK OFFICE
CERTIFICATE OF CORRECTION

| | |
|---|---|
| PATENT NO. | : 6,856,419 B2 |
| APPLICATION NO. | : 10/649291 |
| DATED | : February 15, 2005 |
| INVENTOR(S) | : Rafail Bronstein et al. |

It is certified that error appears in the above-identified patent and that said Letters Patent is hereby corrected as shown below:

On title page, item 54, "SYSTEMS" should read -- SYSTEM --.
On title page, at 45, delete "*".
On title page, at "(*)", delete "This patent is subject to a terminal disclaimer."
Column 1, line 2, "SYSTEMS" should read -- SYSTEM --.

Signed and Sealed this

Twenty-first Day of April, 2009

JOHN DOLL
*Acting Director of the United States Patent and Trademark Office*